United States Patent
Ikegami et al.

(10) Patent No.: US 7,512,314 B2
(45) Date of Patent: Mar. 31, 2009

(54) RECORDING/EDITING APPARATUS, RECORDING/EDITING METHOD, COMPUTER PROGRAM PRODUCT, AND SERVER FOR EDITING RECORD CONTENTS

(75) Inventors: Shunji Ikegami, Tokyo (JP); Sampei Asai, Tokyo (JP)

(73) Assignee: Pioneer Corporation, Tokyo (JP)

( * ) Notice: Subject to any disclaimer, the term of this patent is extended or adjusted under 35 U.S.C. 154(b) by 611 days.

(21) Appl. No.: 11/027,961

(22) Filed: Jan. 4, 2005

(65) Prior Publication Data
US 2005/0147380 A1    Jul. 7, 2005

(30) Foreign Application Priority Data
Jan. 6, 2004    (JP)    ............... 2004-000993

(51) Int. Cl.
*G11B 7/00* (2006.01)
(52) U.S. Cl. .................. 386/52; 386/83; 725/47; 725/58
(58) Field of Classification Search ............ 386/46, 386/52, 95, 125, 83; 725/25, 47, 58, 133, 725/141, 153
See application file for complete search history.

(56) References Cited

U.S. PATENT DOCUMENTS

| 2002/0100047 A1 | 7/2002 | Matoba et al. | ............... 725/46 |
|---|---|---|---|
| 2002/0100049 A1* | 7/2002 | Yamato et al. | ............... 725/47 |
| 2003/0023987 A1* | 1/2003 | Hiramoto et al. | ............ 725/141 |
| 2003/0198462 A1* | 10/2003 | Bumgardner et al. | ......... 386/83 |

FOREIGN PATENT DOCUMENTS

| JP | 2002-354391 | 12/2002 |
|---|---|---|
| WO | WO9222983 | * 12/1992 |

* cited by examiner

*Primary Examiner*—Thai Tran
*Assistant Examiner*—Mishawn Dunn
(74) *Attorney, Agent, or Firm*—Drinker Biddle & Reath LLP

(57) ABSTRACT

A recording/editing apparatus is provided with an operation inputting device. A user uses this operation inputting device to input record-reservation information, a delete condition to delete record contents from a storage medium, or the like. Moreover, the recording/editing apparatus can access a server via a communicating device and a network. The server accumulates and saves program-information provided from other users, and supplies information corresponding to the delete condition to the recording/editing apparatus, in accordance with a request of the recording/editing apparatus. The recording/editing apparatus judges whether or not the delete condition is satisfied on the basis of the supplied information, and deletes the record contents from the storage medium if the delete condition is satisfied.

14 Claims, 5 Drawing Sheets

RECORDING/EDITING APPARATUS, RECORDING/EDITING METHOD, COMPUTER PROGRAM PRODUCT, AND SERVER FOR EDITING RECORD CONTENTS

BACKGROUND OF THE INVENTION

1. Field of the Invention

The present invention relates to a recording/editing apparatus capable of recording and editing a broadcast program or the like on a storage medium, such as a hard disc and a DVD, as well as a recording/editing method, a computer program product, and a server for editing record contents.

2. Description of the Related Art

Since this type of recording/editing apparatus has limitations on a recording capacity of the storage medium, a user uses the storage medium efficiently, for example, by searching a program list for a program which matches his preference or taste and then recording it, as well as by confirming its record contents after the recording, and deleting the record contents if it does not match his preference, or the like.

However, with the spread of digital television broadcast, the number of channels and programs tends to increase, so that it is getting complicated to record a broadcast program which is judged by a user to match his preference, and further to review its contents at each time.

In order to solve such problems, there is suggested a program recording method of performing reserved-recording or timer-recording of a program on the basis of a user's preference (e.g. refer to Japanese Patent Application Laying Open NO. 2002-354391). In this recording method, a program is recorded substantially in accordance with the following procedures (a) to (d).

Namely, (a) preference information is generated on a preference information generator on the basis of information about the type of video or images, the genre of music, or the like, which is supplied by a user's operation. (b) The preference information is supplied to a program searching device, and program information which matches the preference information is searched for from a database, to thereby record a program. (c) With respect to the program which is started to be recorded, information about contents of the program is detected by image-texture-information recognition or the like, which is performed by an image-texture-information recognizing device. (d) The detected information is compared to various information about programs on a high user's preference level, and a program judged to be on a low preference level as a result of this comparison is deleted by a deleting device.

According to such a method, as long as a user specifies the type of program that he desires to record, the program based on his preference is reserved and recorded on an apparatus side. In addition, with respect to the program judged to be on a low preference level after the confirmation of the record contents on the apparatus side, the recording is stopped or the record contents is eliminated. Thus, it is possible to reduce a user's load and perform the efficient recording sufficiently reflected in a user's preference.

SUMMARY OF THE INVENTION

The above-described recording method, however, has problems as exemplified below, for example.

In some of the broadcast programs, the contents thereof is accompanied by the occurrence of events and various results (various conclusions or various ends). For example, sports programs which accompany the result of victory or defeat or the like, drama programs whose end is unknown or unpredictable, and the like are listed. In this type of broadcast program, depending on how the contents develops, a user wants to store the program in some cases, or on the contrary, a user wants to delete the program in some cases. In this situation, in the above-described method, it is difficult to judge whether the real-time events and results satisfy a user's preference, because the information which is stored in a preservation/deletion parameter memory and which is considered to be on a high user's preference level is formed on the basis of audiovisual results in the past. Therefore, with respect to the recorded and stored program, after all, a user frequently needs to confirm the contents thereof at each time and select whether to delete or store it.

Namely, the above-described conventional recording method has such a problem that the method is insufficient to reduce a user's operating load while performing the efficient recording which is fully reflected in a user's preference.

It is therefore an object of the present invention to provide a recording/editing apparatus, a recording/editing method, a computer program product, and a server for editing record contents, which can realize the efficient use of a storage medium and the reduction of a user's operating load.

<Recording/Editing Apparatus>

The above objects of the present invention can be achieved by a recording/editing apparatus for recording a broadcast program, which is received on a receiving device, onto a rewritable storage medium and editing the recorded broadcast program, the recording/editing apparatus provided with: a record-reserving device for performing record-reservation of the broadcast program; a delete-condition-specifying device for specifying a delete condition to delete the recorded broadcast program from the storage medium; a recording device for recording the broadcast program to which the record-reservation is performed onto the storage medium; and a deleting device for deleting the broadcast program which satisfies the delete condition from the storage medium if contents of the recorded broadcast program satisfies the delete condition.

"Recording (To record)" described here may mean, in typical cases, "to videotape" or "to film". The "record-reserving device" and the "delete-condition-specifying device" described here may be the same inputting device, for example, and one constitutional element of the recording/editing apparatus of the present invention, as well as indicating devices capable of transmitting an instruction from a user who is an operator to the recording/editing apparatus. Therefore, "to reserve" and "to specify" described here do not indicate an action of a user.

According to the recording/editing apparatus, by specifying the delete condition in advance, if the contents of the recorded broadcast program satisfies the delete condition, the broadcast program is deleted by the deleting device from the storage medium. Therefore, a broadcast program which does not satisfy the delete condition is selectively recorded on the storage medium in the end (for example, only a broadcast program which does not satisfy the delete condition is recorded on the storage medium in the end), so that it is possible to realize the efficient use of the storage medium and the reduction of a user's operating load.

In one aspect of the recording/editing apparatus, the recording/editing apparatus is further provided with a communicating device capable of communicating with a predetermined server via a network, wherein the communicating device obtains information corresponding to the delete condition from the predetermined server, and the deleting device deletes the broadcast program which satisfies the delete condition on the basis of the information corresponding to the delete condition, which is obtained by the communicating device.

According to this aspect, the information corresponding to the delete condition can be obtained from the predetermined server, so that the recording/editing apparatus can quickly judge whether or not to delete the broadcast program from the storage medium.

In another aspect of the recording/editing apparatus, the information corresponding to the delete condition is information for indicating whether or not the contents of the recorded broadcast program satisfies the delete condition.

According to this aspect, at a time point of obtaining the information corresponding to the delete condition, it is clear whether or not the delete condition is satisfied, so that it is possible to greatly reduce the operation load of the recording/editing apparatus.

In another aspect of the recording/editing apparatus, the communicating device automatically obtains the information corresponding to the delete condition, after the recording of the broadcast program ends.

According to this aspect, the recording/editing apparatus automatically obtains the information corresponding to the delete condition after the record reservation ends, so that it is possible to greatly reduce a user's operating load.

In another aspect of the recording/editing apparatus, the recording/editing apparatus is further provided with a search-condition-specifying device for specifying a search condition to search for the broadcast program desired to be recorded, wherein the record-reserving device performs record-reservation of the broadcast program which satisfies the search condition specified by the search-condition-specifying-device.

The "search-condition-specifying device" described here is the same inputting device as the "record-reserving device" and the "delete-condition-specifying device" described above, for example, and one constitutional element of the recording/editing apparatus of the present invention, as well as indicating a device capable of transmitting the search condition to the recording/editing apparatus. Therefore, "to specify" described here does not indicate an action of a user.

According to this aspect, the record-reservation is performed with respect to the broadcast program which satisfies the search condition, so that it is possible to perform efficient record.

In another aspect of the recording/editing apparatus, the recording/editing apparatus is further provided with a search-condition-specifying device for specifying a search condition to search for the broadcast program desired to be recorded, wherein the record-reserving device performs record-reservation of the broadcast program, on the basis of information about the broadcast program which satisfies the search condition notified by the predetermined server, which performs a program search on the basis of the search condition specified by the search-condition-specifying device.

According to this aspect, the record-reserving-device performs the record-reservation on the basis of the information about the broadcast program which satisfies the search condition, so that it is possible to greatly reduce a user's operating load.

In another aspect of the recording/editing apparatus, the deleting device asks a user for permission to delete the broadcast program which satisfies the delete condition if the contents of the recorded broadcast program satisfies the delete condition.

According to this aspect, if there is a broadcast program which satisfies the delete condition, a user is asked for permission to delete the broadcast program, so that it is possible to prevent the situation that the record contents is eliminated by accident.

In another aspect of the recording/editing apparatus, the record-reserving device, if the contents of the recorded broadcast program does not satisfy the delete condition, performs record reservation of another broadcast program related to the recorded broadcast program which does not satisfy the delete condition.

According to this aspect, it is possible to simply record the broadcast program desired to be recorded derivatively depending on the contents of the broadcast program.

<Recording/Editing Method>

The above objects of the present invention can be also achieved by a first recording/editing method of recording a broadcast program, which is received on a receiving device, onto a rewritable storage medium and editing the recorded broadcast program, the recording/editing method provided with: a record-reserving process of performing record-reservation of the broadcast program; a delete-condition-specifying process of specifying a delete condition to delete the recorded broadcast program from the storage medium; a recording process of recording the broadcast program to which the record-reservation is performed; and a deleting process of deleting the broadcast program which satisfies the delete condition, from the storage medium if contents of the recorded broadcast program satisfies the delete condition.

According to the first recording/editing method, by specifying the delete condition in advance, if the contents of the recorded broadcast program satisfy the delete condition, the broadcast program is deleted in the deleting process from the storage medium. Therefore, a broadcast program which does not satisfy the delete condition is selectively recorded on the storage medium in the end (for example, only a broadcast program which does not satisfy the delete condition is recorded on the storage medium in the end), so that it is possible to realize the efficient use of the storage medium and the reduction of a user's operating load.

The above objects of the present invention can be also achieved by a second recording/editing method of recording and editing a broadcast program on a storage medium in a communication system in which a recoding/editing apparatus, which includes a server and the storage medium, is accommodated in a network, the recording/editing method provided with: a record-reserving/storing process of performing record-reservation of the broadcast program and storing a delete condition to delete the recorded broadcast program from the storage medium onto which the broadcast program is recorded on the basis of the record-reservation, in the recording/editing apparatus; a recording process of recording the broadcast program to which the record-reservation is performed, on the basis of the record-reservation, in the recording/editing apparatus; an obtaining process of obtaining information related to contents of the broadcast program or another broadcast program, in the server; an accessing/selectively-obtaining process of accessing the server via the network after the recording of the broadcast program ends, and selectively obtaining information corresponding to the delete condition from among the information obtained by the server or information generated by the server on the basis of the information obtained by the server, in the recording/editing apparatus; and a deleting process of deleting the recorded broadcast program from the storage medium on the basis of the delete condition and the information corresponding to the delete condition, in the recording/editing apparatus.

According to the second recording/editing method, the recording/editing apparatus can selectively obtain the information corresponding to the delete condition, from the information obtained by the server or the information generated by the server on the basis of the information obtained by the server in the communicating system. Therefore, it is possible to realize the efficient use of the storage medium and the reduction of a user's operating load.

In one aspect of the second recording/editing method, the second recording/editing method is further provided with: a registering process of registering the stored delete condition on the server via the network, in the recording/editing apparatus; and a selectively-obtaining process of selectively obtaining information about the broadcast program corresponding to the registered delete condition, in the server.

According to this aspect, the delete condition is registered on the server, and the information about the broadcast program corresponding to the registered delete condition is selectively obtained, so that it is possible to realize the efficient use of the storage medium and the reduction of a user's operating load.

In another aspect of the second recording/editing method, the second recording/editing method is further provided with a notifying process of notifying the recording/editing apparatus which registers the delete condition, via the server, of the selectively obtained information or information for indicating whether or not the information about the broadcast program corresponding to the registered delete condition is obtained, in the server.

According to this aspect, it is possible to obtain the information corresponding to the delete condition or the information for indicating whether or not the server obtains the information corresponding to the delete condition, in the recording/editing apparatus, so that it is possible to reduce the load of the recording/editing apparatus.

Incidentally, in response to various aspects in the above-described recording/editing apparatus of the present invention, the first or second recording/editing method of the present invention can also take various aspects.

<Computer Program Product>

The above object of the present invention can be achieved by a computer program product in a computer-readable medium for tangibly embodying a program of instructions executable by a computer in a computer system to make the computer function as the above described recording/editing apparatus (including its various aspects).

According to the computer program product of the present invention, the above described recording/editing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer in the computer system, or by downloading the computer program product, which may be a carrier wave, into the computer in the computer system via a communication device. More specifically, the computer program product may include computer readable codes to cause the computer in the computer system (or may comprise computer readable instructions for causing the computer) to function as the above-described recording/editing apparatus.

Incidentally, in response to various aspects in the above-described recording/editing apparatus of the present invention, the computer program product of the present invention can also take various aspects.

<Server for Editing Record Contents>

The above object of the present invention can be achieved by a server for editing record contents which is used by a plurality of users via the above-described recording/editing apparatus (including its various aspects), to which the server is connected via a network, the server provided with: an identifying device for individually identifying the plurality of users via the network; a first obtaining device for obtaining the delete condition registered by the plurality of users via the network; a second obtaining device for obtaining information about the broadcast program from the plurality of users via the network; and a supplying device for supplying information corresponding to the delete condition, from among the obtained information or information generated on the basis of the obtained information, to the plurality of users who register the delete condition via the network.

According to the server for editing record contents, the information corresponding to the delete condition is supplied to the recording/editing apparatus, so that it is possible to realize the efficient use of the storage medium and the reduction of a user's operating load.

As explained above, according to the recording/editing apparatus, it is provided with: the record-reserving device; the delete-condition-specifying device; the recording device; and the deleting device, so that it is possible to realize the efficient use of the storage medium and the reduction of a user's operating load.

As explained above, according to the first recording/editing method, it is provided with: the record-reserving process; the delete-condition-specifying process; the recording process; and the deleting process, so that it is possible to realize the efficient use of the storage medium and the reduction of a user's operating load.

As explained above, according to the second recording/editing method, it is possible to realize the efficient use of the storage medium and the reduction of a user's operating load.

As explained above, according to the computer program product, the computer in the computer system is made to function as the above-described recording/editing apparatus (including its various aspects), so that it is possible to realize the above-described recording/editing apparatus of the present invention relatively easily.

As explained above, according to the server for editing record contents, it is possible to realize the efficient use of the storage medium and the reduction of a user's operating load.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

An embodiment of the present invention will be hereinafter explained with reference to the accompanying drawings.

<Structure>

Figure 1:
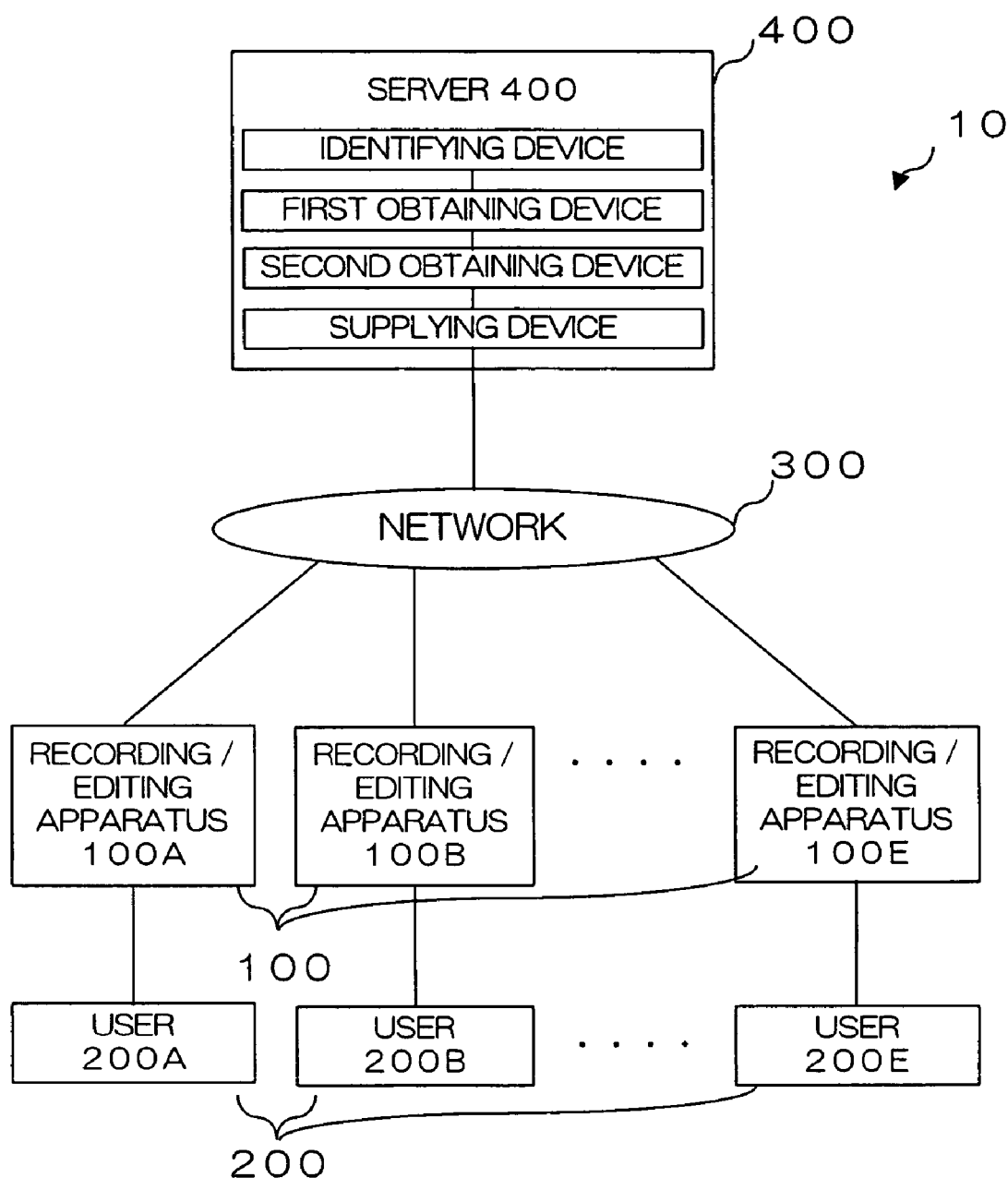
FIG. 1 is a block diagram showing a recording/editing system associated with an embodiment of the present invention.

At first, the structure of a recording/editing system associated with the embodiment of the present invention will be explained with reference to FIG. 1. FIG. 1 shows a recording/editing system 10.

In FIG. 1, the recording/editing system 10 is provided with: recording/editing apparatuses 100; users 200; a network 300; and a server 400.

The recording/editing apparatuses 100 are provided with recording/editing apparatuses 100A, 100B, . . . , and 100E, and each is one example of the "recording/editing apparatus" of the present invention and performs the recording of the broadcast program. The users 200 are provided with a plurality of users 200A, 200B, . . . , and 200E, and each owns respective one of the recording/editing apparatuses 100A, 100B, . . . , and 100E. Moreover, each user 200 is allowed to access the server 400.

Incidentally, in this specification, if it is unnecessary to specify the individual recording/editing apparatuses, the "recording/editing apparatus or apparatuses 100 (i.e. without A, B, . . . , and E)" is used, and in the same manner, if it is unnecessary to specify the individual users, the "user or users 200 (i.e. without A, B, . . . , E)" is used for explanation.

The network 300 is constructed by using general telephone lines, for example, and is represented by an Internet environment using ADSL (Asymmetric Digital Subscriber Line) or the like. By virtue of the network 300, the users 200 can send and receive the data with the server 400. Incidentally, the network 300 may be LAN (Local Area Network) as represented by the Ethernet (registered trademark) standard or the like.

The server 400 is one example of the "server" and the "server for editing record contents" of the present invention, provided on the network 300. The server 400 sends and receives the data with the users 200. The server 400 functions as one example of each of the "identifying device", the "first obtaining device", the "second obtaining device", and the "supplying device" of the present invention.

Figure 2:
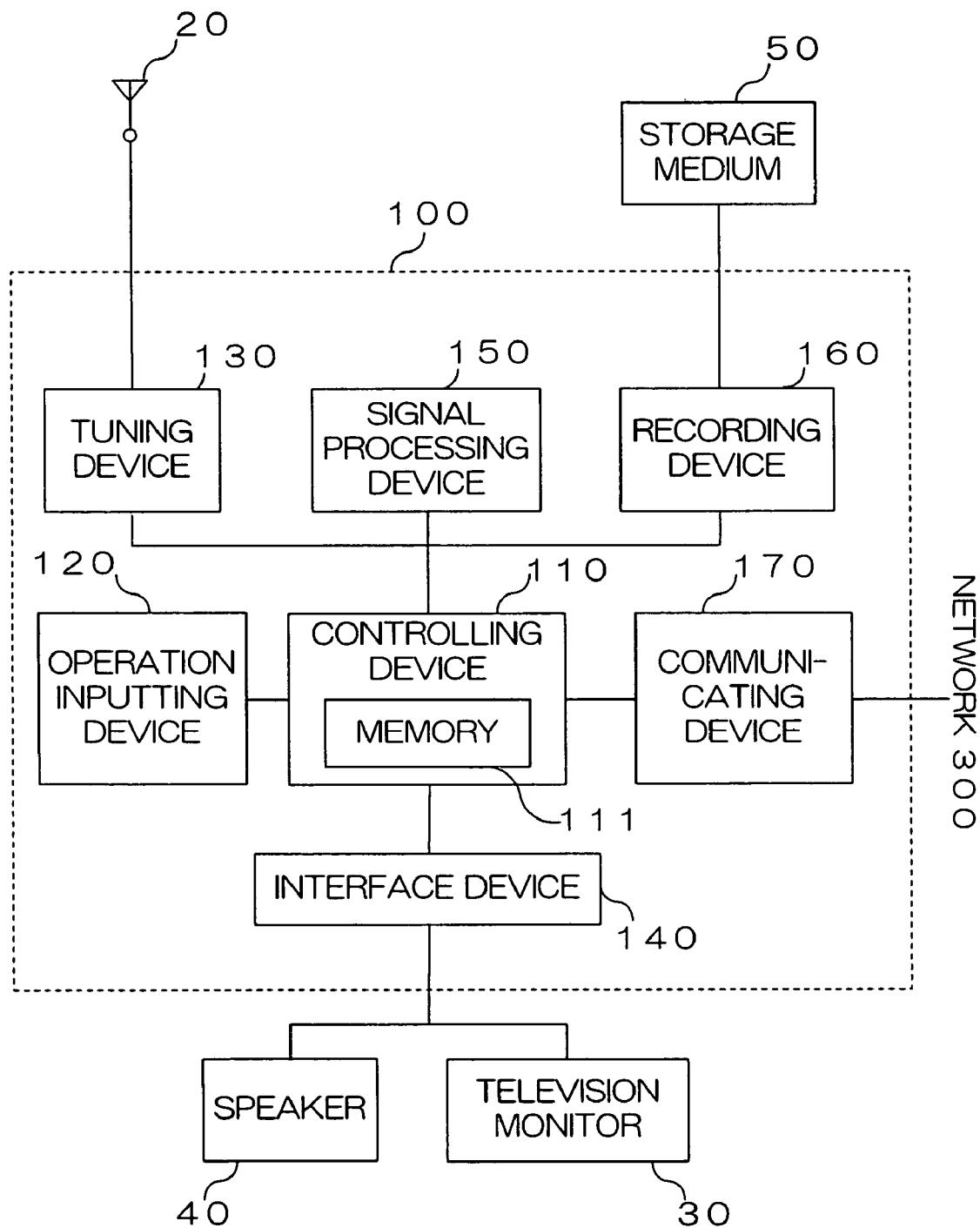
FIG. 2 is a block diagram of a recording/editing apparatus associated with the embodiment.

Next, the details of the recording/editing apparatus 100 will be explained with reference to FIG. 2. FIG. 2 shows the recording/editing apparatus 100.

The recording/editing apparatus 100 is provided with: a controlling device 110; an operation inputting device 120; a tuning device 130; an interface device 140; a signal processing device 150; a recording device 160; and a communicating device 170.

The controlling device 110 is provided with: a CPU (Central Processing Unit); a ROM (Read Only Memory); a RAM (Random Access Memory); or the like (which are not illustrated), and controls each device as described later of the recording/editing apparatus 100 on the basis of information inputted by the operation inputting device 120 described later. Incidentally, in the embodiment, the controlling device 110 is further provided with a memory 111 as a buffer. The controlling device 110 functions as one example of each of the "record-reserving device" and the "deleting device" in the present invention.

The operation inputting device 120 is an inputting device for making various requests to the recording/editing apparatus 100. For example, power-on, time setting, channel designation, recording instructions, reproduction instructions, record-reservation, a delete condition and the like are inputted via the operation inputting device 120. After performing the record-reservation of a broadcast program desired by the user 200, the controlling device 110 monitors time with a timer or the like on the basis of the information inputted from the operation inputting device 120, and controls the recording device 160 or the like as described later to record the program when a designated time point comes. The operation inputting device 120 constitutes one example of the "delete-condition-specifying device" in the present invention, and constitutes one example of the "record-reserving device" in the present invention with the controlling device 110. Incidentally, the delete condition will be explained later.

The form of the operation inputting device 120 is, for example, such as a keyboard, an operation panel with operation buttons and an operation dial, a pointing device like a mouse, and a remote controller, and is not limited if capable of sending a request of the user 200 to the recording/editing apparatus 100. Moreover, the operation inputting device 120 may be provided with a display device, such as a display. Furthermore, like a touch panel, the inputting device and the display device may be constructed in one body.

The tuning device 130 functions as one example of the "receiving device" in the present invention, and obtains a broadcast signal which is superimposed onto television broadcast waves received via an antenna 20. The tuning device 130 tunes in to a frequency band (so-called "channel") designated by the controlling device 110 at each time, and obtains the broadcast signal of the channel (i.e. a video signal and an audio signal or the like). At the same time, the tuning device 130 demodulates the broadcast signal and further separates or extracts the video signal and the audio signal from the broadcast signal. Incidentally, the signal form may be an analog type, or a digital type as represented by ground-wave digital broadcasting. In the case of the broadcast signal of the digital type, it is possible to obtain the data for constituting an electronic program list, such as EPG (Electronic Program Guide).

The interface device 140 is an interface which electrically connects the recording/editing apparatus 100 with a television monitor 30 and a speaker 40. The broadcast program recorded by the recording/editing apparatus 100 is supplied to the television monitor 30 and the speaker 40 via a connection cable or the like from the interface device 140, and thus the user 200 can watch the program.

Incidentally, the television monitor 30 and the speaker 40 may be unified with a television receiver provided with a tuner and various signal-processing-circuits, as one constituent of the television receiver. Moreover, the recording/editing apparatus 100 may be constructed in one body, in such a form that it is built in the television receiver. The point is that the recording/editing apparatus of the present invention may have a function as the television receiver and further different functions, in a range of securing the effect of the present invention, which is clarified by the explanations described above or described later.

The signal processing device 150 generates video data to display on the television monitor 30, and audio data to sound at the speaker 40, on the basis of the video signal and the audio signal separated or extracted by the tuning device 130. At the same time, the signal processing device 150 performs a process of converting the data into a suitable format to be recorded onto a storage medium 50. Incidentally, this process is one example of the processes performed by the signal processing device 150. As long as it is not opposed to the scope of the present invention, the other processes, such as noise removal and signal compression, may be further performed.

The recording device 160 constitutes the "recording device" of the present invention, which records a broadcast program onto the storage medium 50. In recording the broadcast program, on the basis of direct instructions from the operation inputting device 120 or recording instructions by the above-described reserved recording or the like, the controlling device 110 controls the tuning device 130 and obtains the broadcast signal of the broadcast program in which recording is instructed. The broadcast signal is once stored in the memory 111 by the controlling device 110, and then, converted into the data having a suitable format to save the data onto the storage medium 50. The recording device 160 records the broadcast program, by writing the data onto the storage medium 50.

The storage medium 50 conceptually indicates a rewritable storage medium, as represented by a magnetic disk, such as a hard disk, and an optical disc, such as a DVD-RW, a DVD+RW, and a DVD-RAM, or the like. The form of the storage medium 50 is not limited in a range indicated by the concept.

An aspect of the recording device 160 varies depending on an aspect of the storage medium 50. For example, if a hard disk is used as the storage medium 50, the recording device 160 is constructed as one hard disk drive including the storage medium 50. Moreover, if an optical disc, such as a DVD-RW, is used as the storage medium 50, the recording device 160 is a drive unit into which the disc can be inserted, and the storage medium 50 can be replaced and used if needed. Namely, the "recording device" of the present invention includes all of what can record the broadcast signal or the data correlating with the broadcast signal or the like onto the storage medium 50.

Incidentally, as described above, if the magnetic disk or the optical disc is used as the storage medium 50, the recording device 160 may be also constructed to not only write the data onto the storage medium 50, but also read the data. It is also possible to reproduce the recorded program by using this reading function. Namely, the data associated with the broadcast signal of the recorded program is read from the storage medium 50 by the recording device 160, and is once stored in the memory 111. A predetermined processing is performed to the data by the signal processing device 150, and then the data is supplied to the television monitor 30 and the speaker 40 via the interface device 140. In this manner, the users 200 can watch the recorded program arbitrarily. Namely, the recording device 160 has the same function as a storage device in a general computer system.

Moreover, the recording device 160 can delete the record contents on the storage medium 50 anytime, under the control of the controlling device 110. Namely, the recording device 160 also functions as the "deleting device" in the present invention, with the controlling device 110.

The communicating device 170 is one example of the "communicating device" of the present invention, which can connect the recording/editing apparatus 100 with the network 300 and which can send and receive the data with the server 400 via the network 300.

<Operation>

Figure 3:
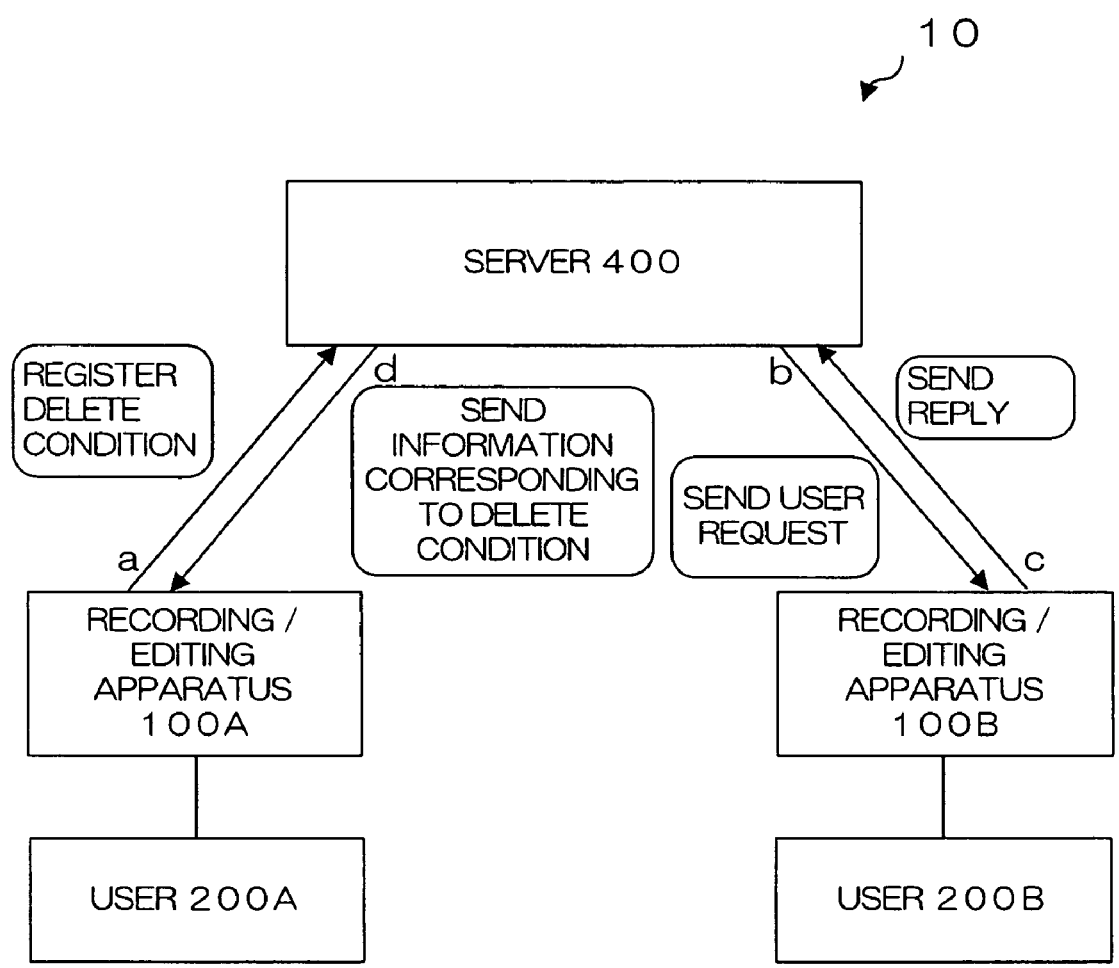
FIG. 3 is a conceptual diagram showing the recording/editing system.
Figure 4:
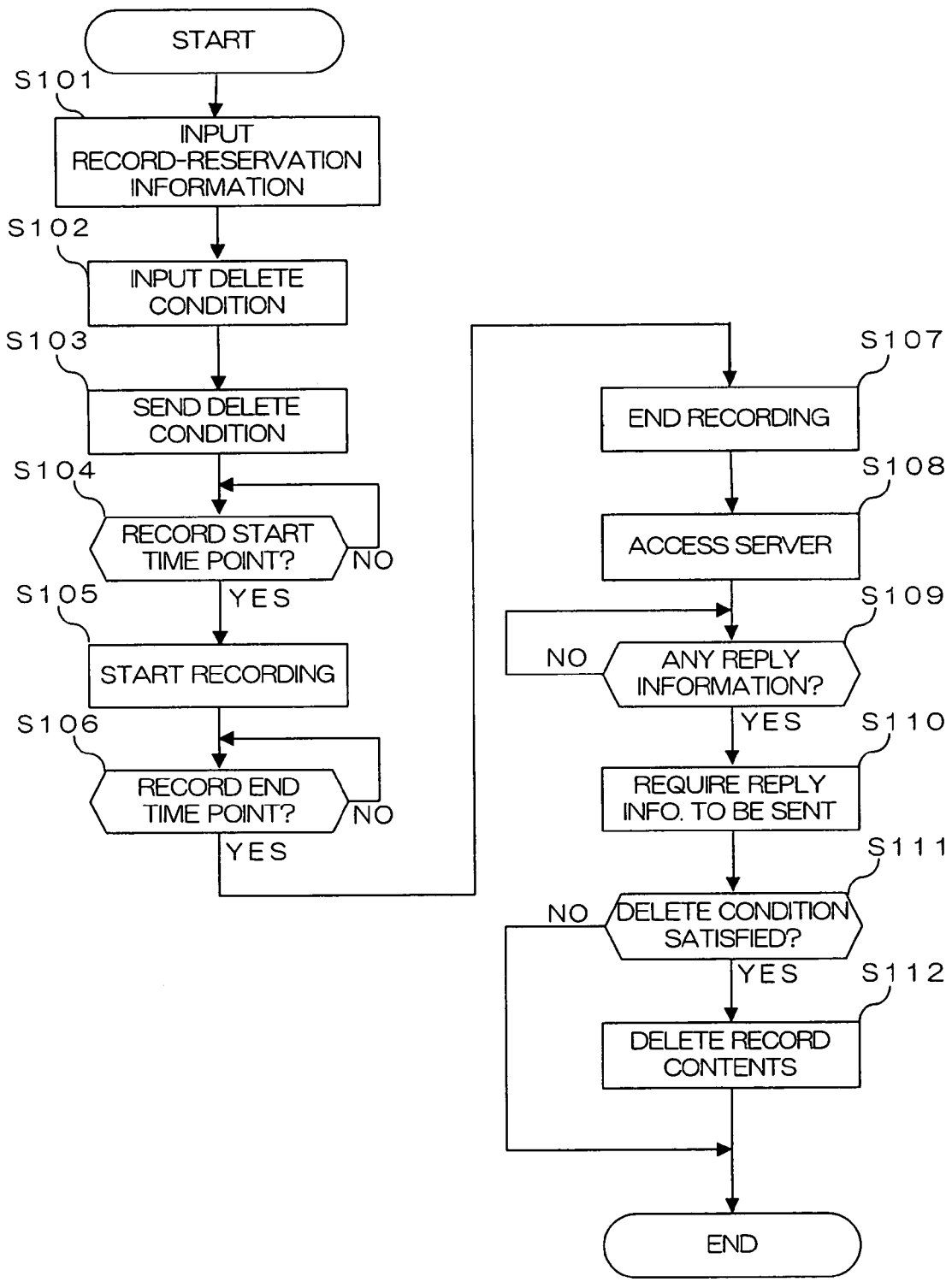
FIG. 4 is a flowchart showing a recording/editing process of the recording/editing apparatus.

Next, the operations in the embodiment will be explained with reference to FIG. 3 and FIG. 4. FIG. 3 conceptually shows the recording/editing system 10, and FIG. 4 is a flowchart showing a recording/editing process of the recording/editing apparatus 100. Incidentally, the process shown in FIG. 4 is the recording/editing process of the recording/editing apparatus 100A, for convenience of explanation. It is obvious, however, that this is common in the recording/editing apparatus 100 (i.e. 100B, . . . , 100E). Moreover, in FIG. 3 and FIG. 4, the duplicated constitutional elements as those in FIG. 1 and FIG. 2 carry the same reference numerals and the explanations of them are omitted. The illustration of one portion of the duplicated constitutional elements is also omitted.

In FIG. 3, the server 400 manages or administrates the plurality of users 200 who use the server 400, with identification information (referred to as a "user ID" here) for individually identifying the users 200. The users 200 can freely access the server 400 by using the user ID. Incidentally, in FIG. 3, only the user 200A and the user 200B are displayed for the simplify explanation.

In FIG. 4, it is assumed that the user 200A desires to record a broadcast program P, for example. In this case, at first, the user 200A inputs record-reservation information, i.e., a recording start time point (a record start time point), a recording end time point (a record end time point), a recording channel, and other information, from the operation inputting device 120 (step S101).

Then, the user 200A uses the operation inputting device 120 to input a condition for deleting the broadcast program P, which is reserved to be recorded in the step S101, from the storage medium 50 (i.e., the "delete condition" in the present invention) (step S102).

For example, it is assumed that the broadcast program P is about a game played by a professional baseball team H, that the user 200A is a fan of the professional baseball team H, and that the user 200A desires to watch the recorded broadcast program P only if the professional baseball team H wins. In this case, the user 200A operates the operation inputting device 120 and inputs "a lost game of the professional baseball team H" or the like, as the delete condition.

The "delete condition" described here is a conception that broadly indicates results accompanied by the contents of the broadcast, the occurrence of events, or secondary information caused by them. Therefore, in the case of the broadcast program P, for example, it may be such information as "○ ○ hit a home run" or "△ △ pitched a shutout". Moreover, in some broadcast programs, such delete conditions as "an audience rating of Y % or less", "unhappy end", and "little public reaction" may be inputted. Incidentally, there are some broadcast programs in which the results are already clear; for example, a live recorded professional baseball broadcast, and a drama rebroadcast, or the like. However, whether or not the contents of the delete condition is already known does not influence on the input of the delete condition.

The inputted delete condition is once stored in a RAM or the like of the controlling device 110, and then, sent to the server 400 via the network 300 from the communicating device 170, in a predetermined data format, e.g., a HTML (Hyper Text Markup Language) format (step S103 and an arrow in FIG. 3). The server 400 registers and manages this delete condition for each user ID, and manages it as the delete condition of the user 200A.

After the transmission of the delete condition ends, the controlling device 110 of the recording/editing apparatus 100A judges whether or not the present time point is the recording start time point designated by the user 200A, with a timer or the like, at predetermined timing intervals (step S104). If the present time point is not the recording start time point (the step S104: NO), the controlling device 110 repeats the step S104 until the recording start time point comes. When the recording start time point comes (the step S104: YES), the controlling device 110 controls the tuning device 130, the signal processing device 150, and the recording device 160, to start recording the specified broadcast program (step S105). During the recording, the data of the broadcast signal of the broadcast program is recorded onto the storage medium 50 by the recording device 160.

If the recording is started, the controlling device 110 judges, by the time monitoring with a timer, whether or not the present time point is the recording end time point designated by the user 200A (step S106). If the present time point is not the recording end time point (the step S106: NO), the controlling device 110 repeats the step S106 and performs the control to continue the recording of the broadcast program performed by the tuning device 130, the signal processing device 150, and the recording device 160. When the recording end time point comes (the step S106: YES), the controlling device 110 ends the recording (step S107). After the step S107 ends, the broadcast signal of the broadcast program P is stored on the storage medium 50.

Now, back in FIG. 3 again, the server 400 manages the delete conditions sent from not only the user 200A but also the users 200, for each user. The server 400 generates request information on the basis of these delete conditions or elements extracted from the delete conditions, or the like, and sends the request information to the recording/editing apparatuses 100 owned by the users 200 at constant timing, as the newest user request registered at the present time point (an arrow b in FIG. 3). Incidentally, in FIG. 3, the user request is sent only to the recording/editing apparatus 100B owned by the user 200B, but actually, the user request is sent to all of the recording/editing apparatuses 100 including the recording/editing apparatus 100A of the user 200A. The sent user request may be confirmed on the operation inputting device 120 of the recording/editing apparatus 100 or on the television monitor 30.

The user 200B judges whether or not there is anything he can reply in the user request sent from the server 400, and sends a reply if any (an arrow c in FIG. 3).

Figure 5A:
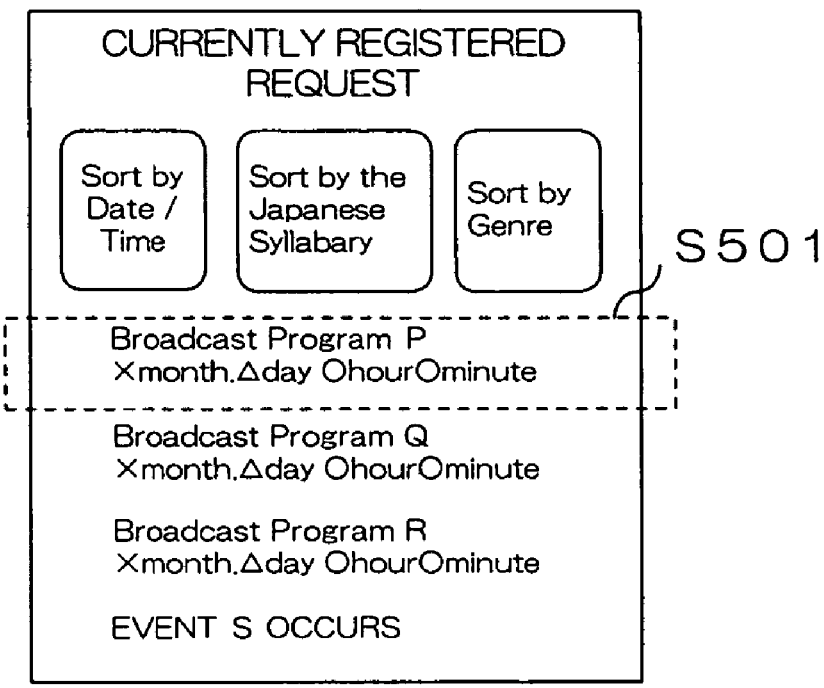
FIG. 5A and FIG. 5B are schematic diagrams showing a reply sending screen associated with the recording/editing system.
Figure 5B:
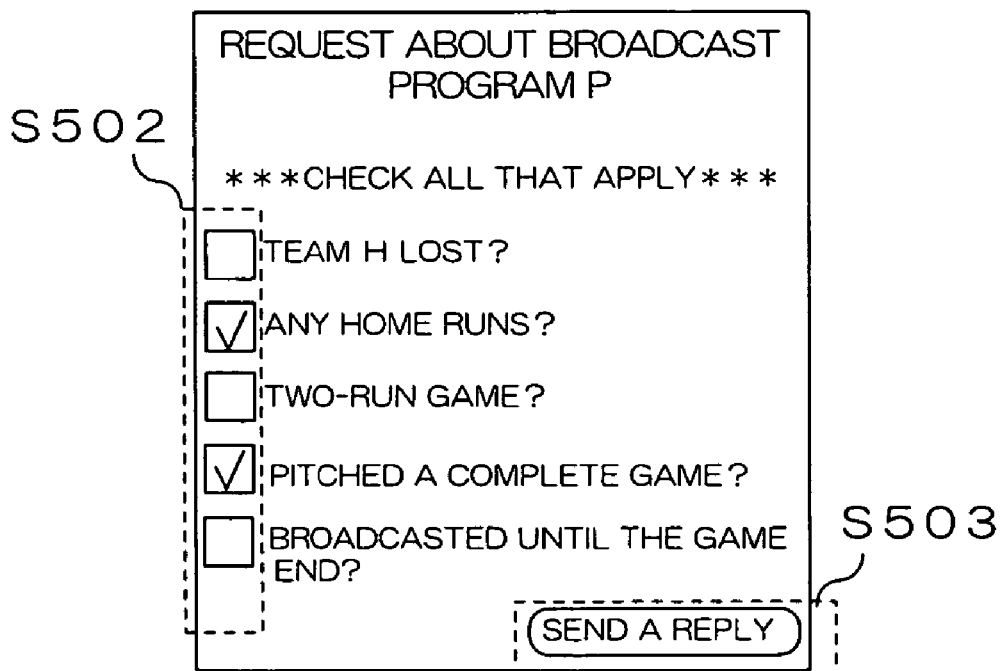

FIG. 5A and FIG. 5B show a reply sending screen associated with the recording/editing system. It is assumed that the user 200B is a viewer of the broadcast program P, which is reserved to be recorded by the user 200A. In this case, the user 200B selects the "broadcast program P" from the user request (in FIG. 5A) sent from the server 400 (step S501). Incidentally, the aspect of this user request is not limited to the form illustrated in FIG. 5A.

After selecting the broadcast program P, the user 200B replies each check item of the request about the broadcast program P (FIG. 5B) which appears on the screen, in a range of own belief and knowledge. This reply operation is performed by checking a check box provided next to each request item (step S502). Lastly, if the user 200B selects a "reply sending" button (step S503), the reply sending operation ends, and the reply is sent from the user 200B to the server 400. Among the server 400 and the users 200, this type of transmission and reception are frequently (or always) performed via the network 300 and the recording/editing apparatuses 100. Obviously, there may be a case where the user 200B does not reply this request because of no time or for similar reasons, for example. The server 400 saves the sent reply, as reply information which is the "information corresponding to the delete condition" in the present invention, in the above-described predetermined format.

The server 400 judges which delete condition is related to the reply information sent by the user 200B. In this case, the contents of the reply by the user 200B are about the broadcast program P, i.e., the game result of the professional baseball team H, so that the server 400 judges that this reply contents are related to the delete condition registered by the user 200A.

A reply information saving box is prepared for each ID in the server 400, and as a result of the judgment described above, a copy of the reply information of interest is saved in the reply information saving box of the user 200 who registered the corresponding delete condition. Therefore, in this case, the reply information replied by the user 200B is stored into the reply information saving box of the user 200A.

Incidentally, the server 400 may generate and save not only the reply information, which is sent by the users 200 in this manner, but also secondary information, such as an audience rating of a broadcast program obtained from another network system or the like, and public reaction for the broadcast program of interest, which is judged from the number of user accesses with respect to the broadcast program in the server 400. On the recording/editing apparatuses 100, it is possible to input this type of secondary information as the delete condition.

Moreover, it is possible to directly copy the reply information from the users 200, into the reply information saving box. Alternatively, it is also possible to generate, from the reply information, new reply information which has contents or a format suitable for the operation on the recording/editing apparatus side, and copy it in the reply information saving box. Namely, all of the information for which it is judged whether or not the delete condition is satisfied, including the above-described secondary information, is included in the "information corresponding the delete condition" in the present invention.

Back in FIG. 4 again, after the recording of the broadcast program P ends, the controlling device 110 of the recording/editing apparatus 100A controls the communicating device 170 to access the server 400 automatically (step S108). The recording/editing apparatus 100A is constructed to simultaneously send an identification signal corresponding to the user ID of the user 200A so that the server 400 recognizes it in accessing.

When the access to the server 400 ends, the recording/editing apparatus 100A judges whether or not there is reply information in the reply information saving box corresponding to the user 200A (step S109). If there is no reply information (the step S109: NO), the controlling device 110 repeats the step S109 until reply information is registered into the reply information saving box. If there is reply information (the step S109: YES), the controlling device 110 requires the server 400 to send the reply information (step S110). In accordance with this requirement, the server 400 sends the reply information to the recording/editing apparatus 100A in a predetermined data format (an arrow d in FIG. 3). The controlling device 110 temporarily saves the reply information obtained from the server 400 in this manner, in the RAM.

The "predetermined data format" stated here is the same format as the data format of the delete condition inputted on the recording/editing apparatus 100, and it is constructed such that the server 400 and the recording/editing apparatus 100 can recognize the data saved in this "predetermined format" each other.

Incidentally, in the embodiment, the HTML format is exemplified as this predetermined format, but it is obvious that the data format is not limited to this. Moreover, the mutual recognition of the data may be realized by that the recording/editing apparatus 100 and the server 400 directly recognizes the data to be sent or received each other, or by that the recording/editing apparatus 100 and the server 400 indirectly recognizes the data with a predetermined data conversion device. Namely, as long as the mutual recognition of the data can be performed between the recording/editing apparatus 100 and the server 400 in the end, the format of the data owned by the both is not limited.

The controlling device 110 judges whether or not the delete condition is satisfied on the basis of the reply information obtained from the server 100 (the step S111). If the delete condition is satisfied, the controlling device 110 controls the recording device 160 to delete the broadcast signal about the broadcast program P, which is recorded on the storage medium 50 (step S112). If the delete condition is not satisfied, the recording/editing process ends without doing anything.

As explained above, the recording/editing apparatus 100 in the embodiment can selectively obtain the desired reply information from various reply information, which are registered by the users 200 who use the server 400, and can automatically delete the broadcast program which satisfies the delete condition from the storage medium 50, so that it is possible to realize the efficient use of the storage medium and the reduction of a user's operating load.

Incidentally, in the embodiment, a site or the like of examining (surveying) the contents of a program may be provided in the server 400, as an interface between the server 400 and the users 200. The access to this website by the users 200 provides the same effects as those in the embodiment.

Incidentally, in the embodiment, the record-reservation of a broadcast program is realized by that each of the users 200 inputs the reservation information from the operation inputting device 120, but the aspect of the reservation is not limited to this manner. For example, a search condition for a program that the user 200 desires to record may be inputted via the operation inputting device 120 and sent to the server 400. Namely, the operation inputting device 120 may function as one example of the "search-condition-specifying-device" in the present invention.

In this case, it is preferable if the server 400 searches for a broadcast program which satisfies the search condition, and has a function of sending a search result (reply) to the recording/editing apparatus 100. Moreover, the user 200 may make a record-reservation on the basis of the search result sent from the server 400 in this manner, or the recording/editing apparatus 100 may automatically perform a record-reservation on the basis of the search result. In this case, it is effective because a user's load accompanied by the reservation can be reduced. Moreover, if the broadcast program is a digital broadcast, as represented by ground-wave digital broadcasting, EPG information can be obtained, so that the recording/editing apparatus 100 may search this EPG for the broadcast program and perform the record-reservation. In this case, since it is unnecessary to pass through the network 300, the response of the search improves, as compared to the case where the server 400 is used.

Moreover, for example, like a professional baseball game, there is a case where a game is once broadcasted, and again, the content of the game is broadcasted in such a manner as sports news. In this case, it may be desired that these related broadcast programs are recorded, depending on the result of the game. In this case, the server 400 may use the above-described program searching function to search for a broadcast program that the user 200 may desire to additionally record, and notify the recording/editing apparatus 100 of the relevant broadcast program. Moreover, the controlling device 110 may search the EPG or the like for the broadcast program that the user 200 may desire to additionally record, and perform the record-reservation. Furthermore, in specifying the delete condition, the user 200 may specify this type of broadcast program desired to be additionally recorded depending on circumstances, with respect to the recording/editing apparatus 100.

There is a case where the possibility of deletion can be already judged, in registering the delete condition. For example, a drama rebroadcast, a news program which broadcasts the results of already played sports, and the like are listed. In this case, when the delete condition is registered in the server 400, the server 400 may search for the presence or absence of the information corresponding to the delete condition from the reply information of the past, quickly register it into the reply information saving box of the user 200, and notify the user 200 that the result is already clear. In this case, the possibility of useless recording is reduced, so that it is effective.

Incidentally, in the embodiment, the server 400 registers the reply information corresponding to the delete information in the reply information saving box corresponding to the individual user 200, and the recording/editing apparatus 100 obtains the reply information and judges whether or not the delete condition is satisfied. The judgment, however, may be performed on the server 400. In this case, if the server 400 generates information associated with the possibility of deletion of an individual broadcast program and registers it in the reply information saving box of the individual user 200 in advance, the load of the controlling device 110 is reduced.

Incidentally, in the embodiment, the controlling device 110 performs loop process until the reply information is registered in the reply information saving box, but the desired reply information is not always obtained favorably after the recording ends. In view of the fact, the server 400 may notify the recording/editing apparatus 100 that the reply information is registered into the reply information saving box. By that the controlling device 110, which receives this notification as a start command, accesses the reply information saving box, it is possible to make the process efficient.

Moreover, the reply information is not necessarily obtained automatically by the controlling device 110. It may be constructed such that the user 200 confirms the content of the reply information saving box at predetermined timing. It is more preferable that an automatic or manual operation can be selected.

In the embodiment, the reply information is managed by being stored in the reply information saving box. However, the management method of managing the information and the data equal to the information, which is adopted on the server 400, is not limited to that of the embodiment.

In the embodiment, if the delete condition is satisfied, the record contents are automatically deleted by the controlling device 110. However, if the delete condition is satisfied, the controlling device 110 may ask the user 200 for final permission to delete the relevant record contents. By constituting in this manner, it is possible to prevent the deletion of the record contents the user 200 desires to save in the end: for example, in a case where the delete condition itself is insufficient; in a case where the user 200 changes his mind, or the like.

In the embodiment, the delete condition specified by the users 200 is registered in the server 400. However, the delete condition is not necessary registered in the server 400. In this case, it is preferable if the server 400 is constructed such that the users 200 arbitrarily register information owned by the users 200 with respect to the server 400, and that the controlling device 110 can selectively obtain the information corresponding to the delete condition from among the various information.

Incidentally, the server 400 may make BML (Broadcasting Markup Language) contents or the like, which satisfy the individual users' preference, from the delete condition registered by the individual users 200, and may perform a service of sending them to the recording/editing apparatuses 100. According to the service, the satisfaction level of the users 200 improves.

Moreover, in the embodiment, the operation is explained by exemplifying the broadcast program with the video signal and the audio signal, as represented by television broadcasting. However, in the recording/editing apparatus of the present invention, a broadcast program which is recorded and edited is not limited to this, and is broadly defined, including audio broadcasting without the video signal, or data broadcasting.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-000993 filed on Jan. 6, 2004 including the specification, claims, drawings and summary is incorporated herein by reference in its entirety.

What is claimed is:

1. A recording/editing apparatus for recording a broadcast program, which is received on a receiving device, onto a rewritable storage medium and editing the recorded broadcast program,
said recording/editing apparatus comprising:
a record-reserving device for performing record-reservation of the broadcast program;
a delete-condition-specifying device for allowing a user to specify a delete condition to delete the recorded broadcast program from the storage medium by a user input operation;
a recording device for recording the broadcast program to which the record-reservation is performed onto the storage medium; and
a deleting device for deleting the broadcast program which satisfies the specified delete condition from the storage medium if contents of the recorded broadcast program satisfies the specified delete condition,
said delete condition including at least one condition, whose result does not turn out at a start of recording the broadcast program to the storage medium but turns out after the start or completion of recording the broadcast program to the storage medium, of (i) a result or an occurrence of event which are accompanied by the contents of the broadcast, (ii) secondary information caused by the result or the occurrence, and (iii) an audience rating of the broadcast program or public reaction for the broadcast program which is judged from the number of user accesses with respect to the broadcast program.

2. The recording/editing apparatus according to claim 1, further comprising a communicating device capable of communicating with a predetermined server via a network, wherein
said communicating device obtains information corresponding to the specified delete condition from the predetermined server, and
said deleting device deletes the broadcast program which satisfies the specified delete condition on the basis of the information corresponding to the specified delete condition, which is obtained by said communicating device.

3. The recording/editing apparatus according to claim 2, wherein the information corresponding to the specified delete condition is information for indicating whether or not the contents of the recorded broadcast program satisfies the specified delete condition.

4. The recording/editing apparatus according to claim 2, wherein said communicating device automatically obtains the information corresponding to the specified delete condition, after the recording of the broadcast program ends.

5. The recording/editing apparatus according to claim 2, further comprising a search-condition-specifying device for specifying a search condition to search for the broadcast program desired to be recorded, wherein
said record-reserving device performs record-reservation of the broadcast program, on the basis of information about the broadcast program which satisfies the search condition notified by the predetermined server, which performs a program search on the basis of the search condition specified by said search-condition-specifying device.

6. The recording/editing apparatus according to claim 1, further comprising a search-condition-specifying device for specifying a search condition to search for the broadcast program desired to be recorded, wherein
said record-reserving device performs record-reservation of the broadcast program which satisfies the search condition specified by said search-condition-specifying device.

7. The recording/editing apparatus according to claim 1, wherein said deleting device asks the user for permission to delete the broadcast program which satisfies the specified delete condition if the contents of the recorded broadcast program satisfies the specified delete condition.

8. The recording/editing apparatus according to claim 1, wherein said record-reserving device, if the contents of the recorded broadcast program does not satisfy the specified delete condition, performs record-reservation of another broadcast program related to the recorded broadcast program Which does not satisfy the specified delete condition.

9. A recording/editing method of recording a broadcast program, which is received on a receiving device, onto a rewritable storage medium and editing the recorded broadcast program,
said recording/editing method comprising:
a record-reserving process of performing record-reservation of the broadcast program;
a delete-condition-specifying process of allowing a user to specify a delete condition to delete the recorded broadcast program from the storage medium by a user input operation;
a recording process of recording the broadcast program to which the record-reservation is performed; and
a deleting process of deleting the broadcast program which satisfies the specified delete condition, from the storage medium if contents of the recorded broadcast program satisfies the specified delete condition,
said delete condition including at least one condition, whose result does not turn out at a start of recording the broadcast program to the storage medium but turns out after the start or completion of recording the broadcast program to the storage medium, of (i) a result or an occurrence of event which are accompanied by the contents of the broadcast, (ii) secondary information caused by the result or the occurrence, and (iii) an audience rating of the broadcast program or public reaction for the broadcast program which is judged from the number of user accesses with respect to the broadcast program.

10. A computer-readable medium for tangibly embodying a program of instructions executable by a computer in a computer system to make the computer function as a recording/editing apparatus for recording a broadcast program, which is received on a receiving device, onto a rewritable storage medium and editing the recorded broadcast program, said recording/editing apparatus comprising:

a record-reserving device for performing record-reservation of the broadcast program;

a delete-condition-specifying device for allowing a user to specify a delete condition to delete the recorded broadcast program from the storage medium by a user input operation;

a recording device for recording the broadcast program to which the record-reservation is performed onto the storage medium; and a deleting device for deleting the broadcast program which satisfies the specified delete condition from the storage medium if contents of the recorded broadcast program satisfies the specified delete condition, said delete condition including at least one condition, whose result does not turn out at a start of recording the broadcast program to the storage medium but turns out after the start or completion of recording the broadcast program to the storage medium, of (i) a result or an occurrence of event which are accompanied by the contents of the broadcast, (ii) secondary information caused by the result or the occurrence, and (iii) an audience rating of the broadcast program or public reaction for the broadcast program which is judged from the number of user accesses with respect to the broadcast program.

11. A recording/editing method of recording and editing a broadcast program on a storage medium in a communication system in which a recoding/editing apparatus, which includes a server and the storage medium, is accommodated in a network, said recording/editing method comprising:

a record-reserving/storing process of performing record-reservation of the broadcast program and storing a delete condition, which is specified by a delete-condition-specifying device for allowing a user to specify the delete condition by a user input operation, to delete the recorded broadcast program from the storage medium onto which the broadcast program is recorded on the basis of the record-reservation, in said recording/editing apparatus;

a recording process of recording the broadcast program to which the record-reservation is performed, on the basis of the record-reservation, in said recording/editing apparatus;

an obtaining process of obtaining information related to contents of the broadcast program or another broadcast program, in the server;

an accessing/selectively-obtaining process of accessing the server via the network after the recording of the broadcast program ends, and selectively obtaining information corresponding to the stored delete condition from among the information obtained by the server or information generated by the server on the basis of the information obtained by the server, in said recording/editing apparatus; and a deleting process of deleting the recorded broadcast program from the storage medium on the basis of the stored delete condition and the information corresponding to the stored delete condition, in said recording/editing apparatus, said delete condition including at least one condition, whose result does not turn out at a start of recording the broadcast program to the storage medium but turns out after the start or completion of recording the broadcast program to the storage medium, of (i) a result or an occurrence of event which are accompanied by the contents of the broadcast, (ii) secondary information caused by the result or the occurrence, and (iii) an audience rating of the broadcast program or public reaction for the broadcast program which is judged from the number of user accesses with respect to the broadcast program.

12. The recording/editing method according to claim 11, further comprising:

a registering process of registering the stored delete condition on the server via the network, in said recording/editing apparatus; and a selectively-obtaining process of selectively obtaining information about the broadcast program corresponding to the registered delete condition, in the server.

13. The recording/editing method according to claim 12, further comprising a notifying process of notifying said recording/editing apparatus which registers the stored delete condition, via the server, of the selectively obtained information or information for indicating whether or not the information about the broadcast program corresponding to the registered delete condition is obtained, in the server.

14. A server for editing record contents which is used by a plurality of users via a recording/editing apparatus, to which said server is connected via a network, for recording a broadcast program, which is received on a receiving device, onto a rewritable storage medium and editing the recorded broadcast program, said recording/editing apparatus comprising: a record-reserving device for performing record-reservation of the broadcast program; a delete-condition-specifying device for allowing a user to specify a delete condition to delete the recorded broadcast program from the storage medium by a user input operation; a recording device for recording the broadcast program to which the record-reservation is performed onto the storage medium; and a deleting device for deleting the broadcast program which satisfies the specified delete condition from the storage medium if contents of the recorded broadcast program satisfies the specified delete condition, said server comprising:

an identifying device for individually identifying the plurality of users via the network;

a first obtaining device for obtaining the specified delete condition registered by the plurality of users via the network;

a second obtaining device for obtaining information about the broadcast program from the plurality of users via the network; and a supplying device for supplying information corresponding to the specified delete condition, from among the obtained information or information generated on the basis of the obtained information, to the plurality of users who register the specified delete condition via the network, said delete condition including at least one condition, whose result does not turn out at a start of recording the broadcast program to the storage medium but turns out after the start or completion of recording the broadcast program to the storage medium, of (i) a result or an occurrence of event which are accompanied by the contents of the broadcast, (ii) secondary information caused by the result or the occurrence, and (iii) an audience rating of the broadcast program or public reaction for the broadcast program which is judged from the number of user accesses with respect to the broadcast program.

* * * * *